United States Patent [19]

Burniski et al.

[11] Patent Number: 4,616,598

[45] Date of Patent: Oct. 14, 1986

[54] EASY CLEAN PET LITTER BOX

[76] Inventors: Edward W. Burniski, 124 Prospect St., Wilkes-Barre, Pa. 18702; Michael A. Jannuzzi, 1000 Roosevelt St., Edwardsville, Pa. 18704

[21] Appl. No.: 679,922

[22] Filed: Dec. 10, 1984

[51] Int. Cl.$^4$ ............................................. A01K 23/00
[52] U.S. Cl. ......................................................... 119/1
[58] Field of Search ............................. 119/1; 209/398

[56] References Cited

U.S. PATENT DOCUMENTS

| 1,069,799 | 8/1913 | Mayn | 209/398 |
|---|---|---|---|
| 1,595,685 | 8/1926 | Parini | 209/398 |
| 4,030,448 | 6/1977 | Nuttall | 119/1 |
| 4,325,822 | 4/1982 | Miller | 119/1 X |

FOREIGN PATENT DOCUMENTS 1140961  8/1957  France ................... 209/398

*Primary Examiner*—Hugh R. Chamblee
*Attorney, Agent, or Firm*—Lowe Price LeBlanc Becker & Shur

[57] ABSTRACT

An easy to clean pet litter box is provided, in which pet litter with accumulated dry solid animal waste matter is held in a tray with a perforated bottom. Immediately below, and in sliding contact with the perforated tray bottom, is a flat sheet also provided with identically sized and distributed perforations. The perforations are sized to be larger than typical pet litter granules but small enough to prevent throughflow of animal waste lumps, and are conically chamfered to funnel flow therethrough as well as to scrape off any dried waste encrustations located between the sliding elements. By moving the perforated elements to selectively block off all throughflow (closed mode) to complete congruence of apertures permitting maximum throughflow (open mode) the user sepregates waste matter from reusable pet litter within the litter box. Waste matter is then discarded and the tray put into its closed mode and the litter box turned over to resume operation. In another similar embodiment, the perforated tray bottom is simply made an integral partition of a two-part symmetric litter boxy housing. Maximum throughflow in a given screen with circular perforations is obtained when the centers thereof are disposed in a square array whose diagonals are √2 times the perforation diameters at the common sliding contact surface between the screen and the perforated flat sheet.

22 Claims, 18 Drawing Figures

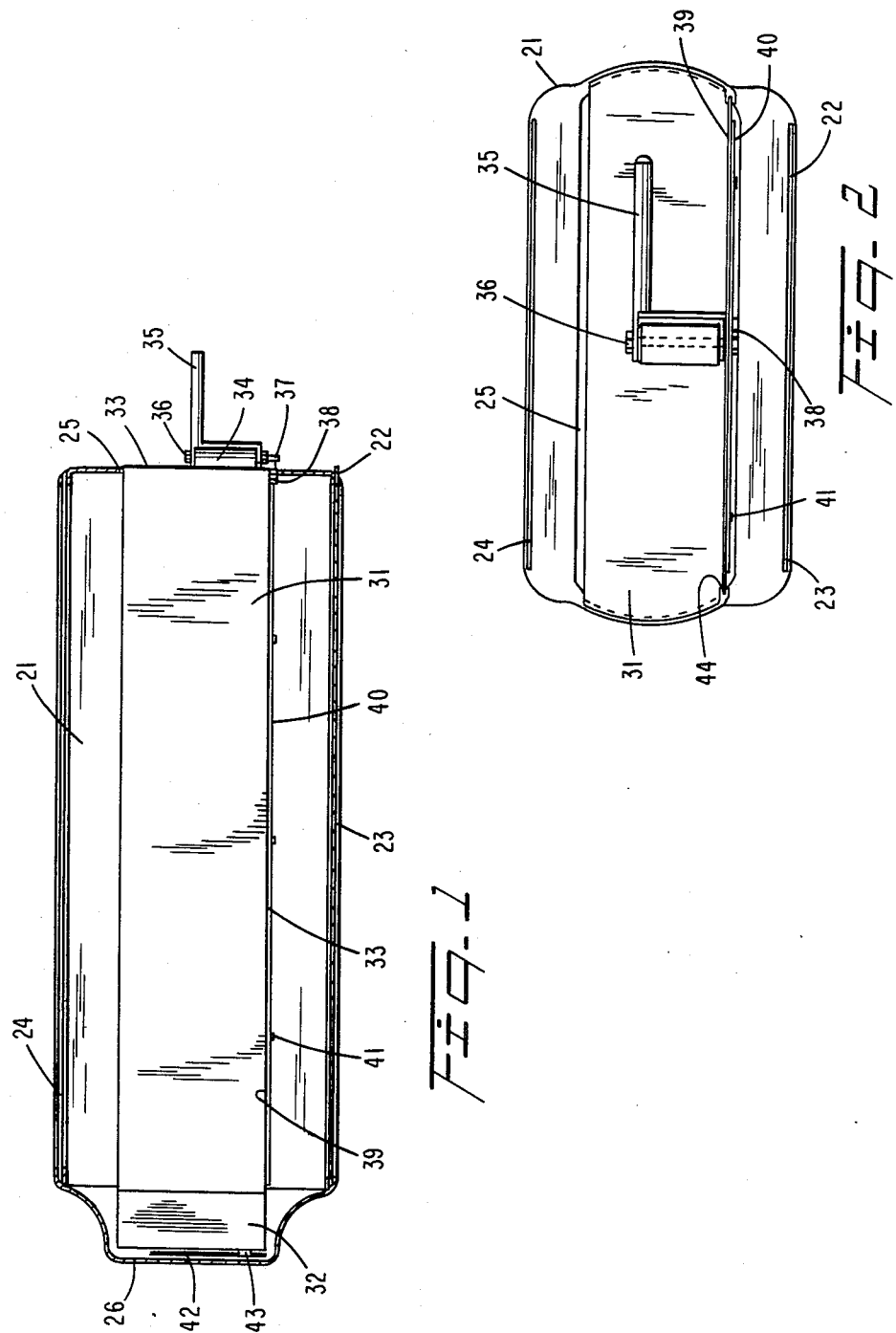

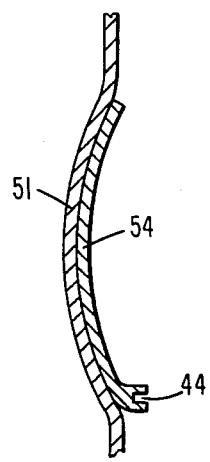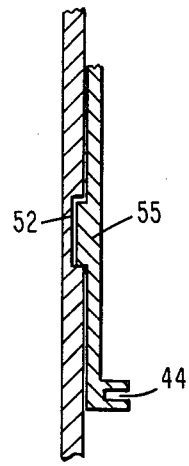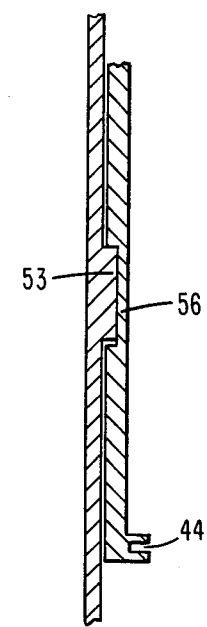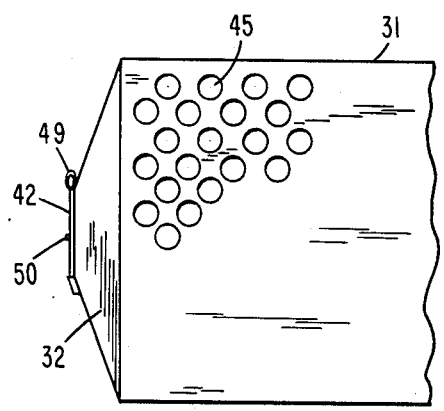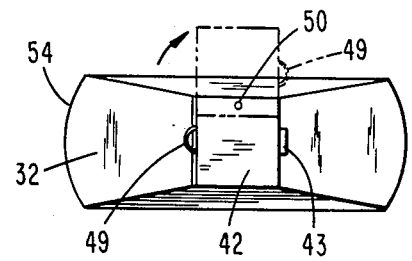

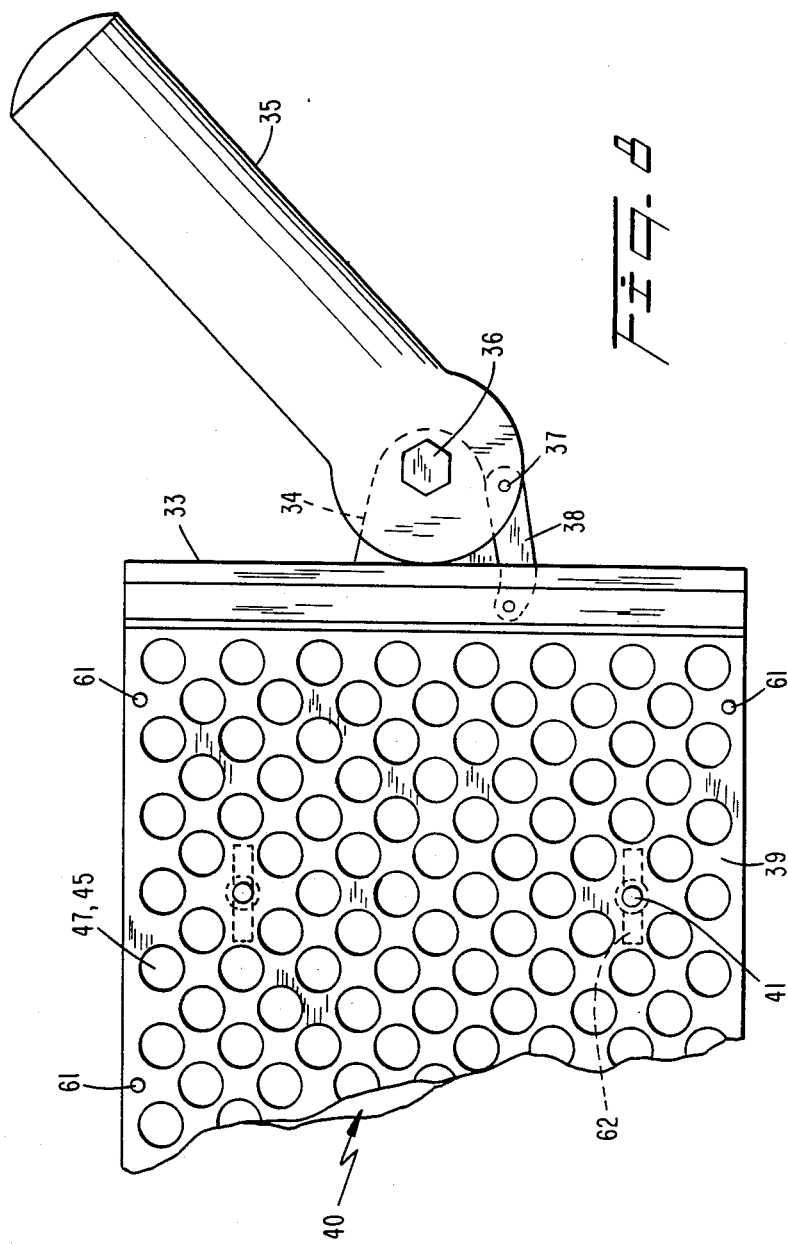

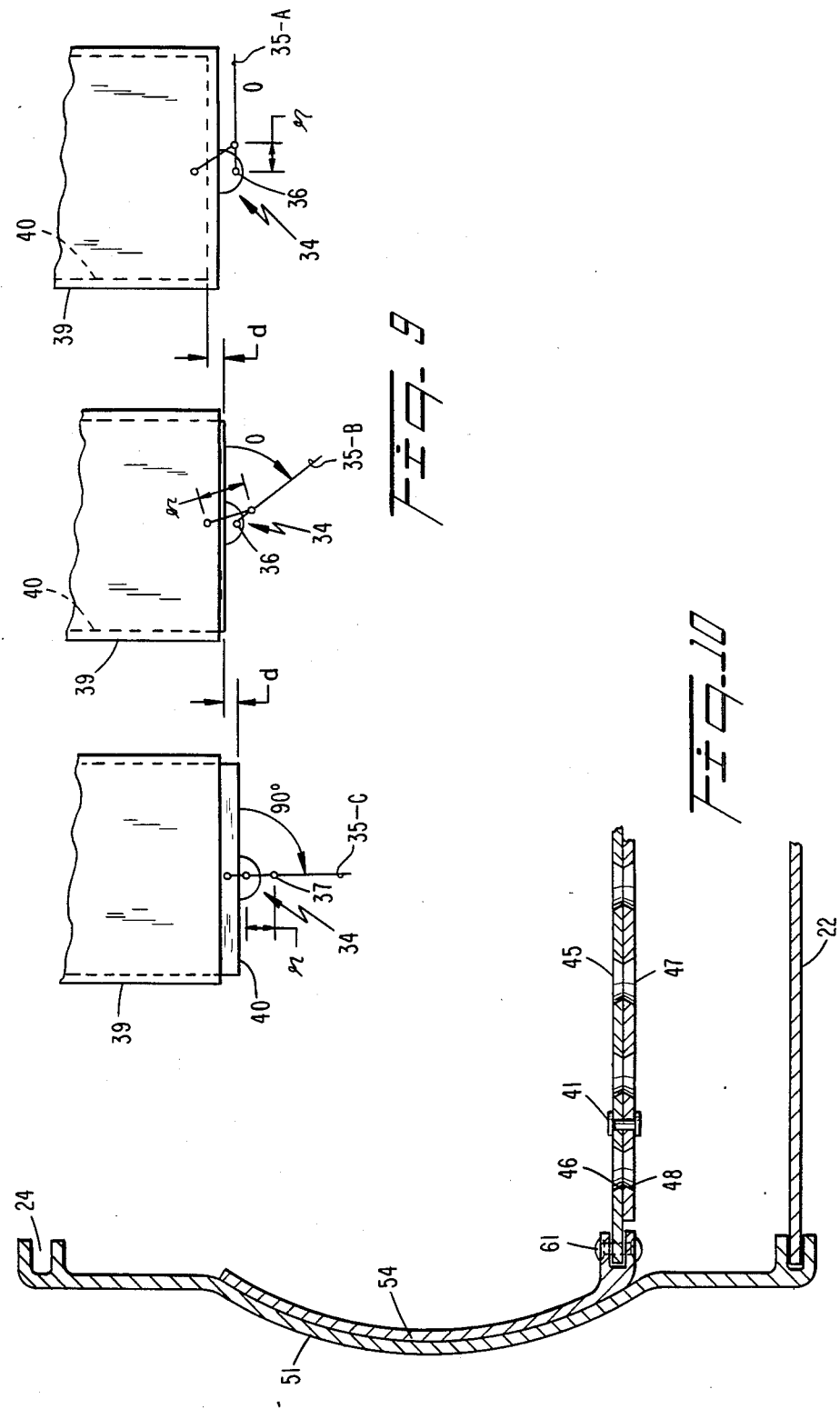

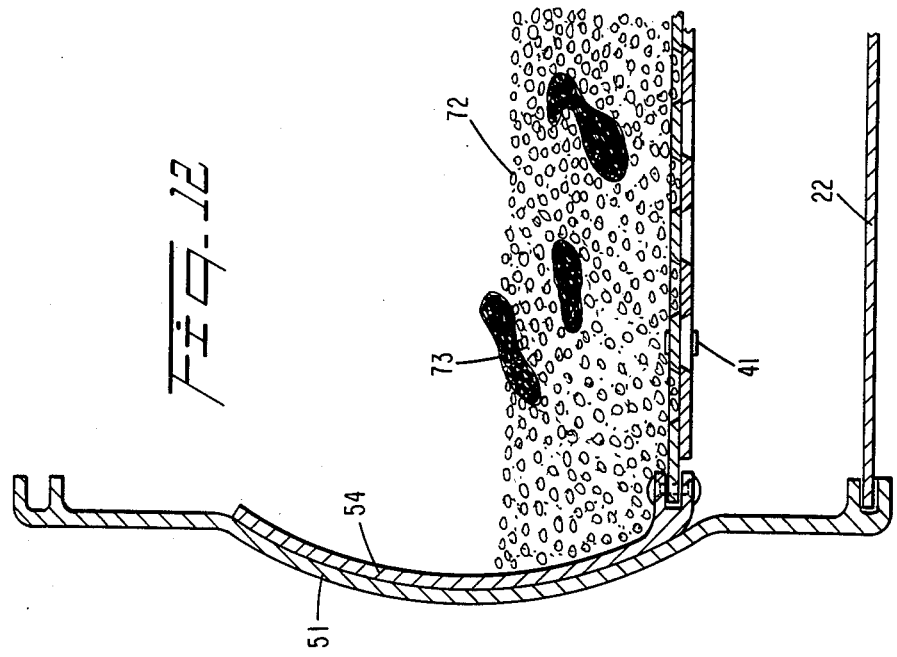
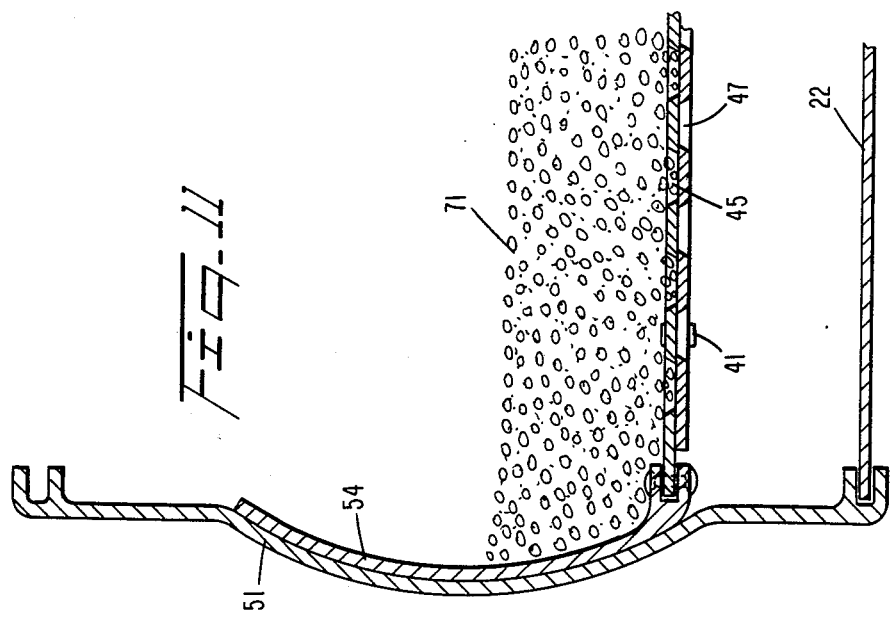

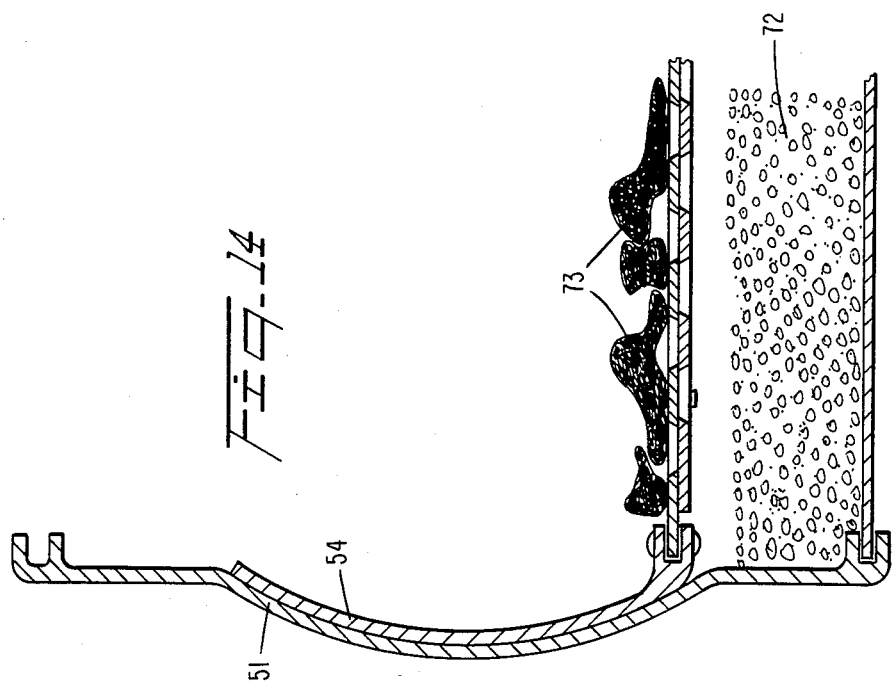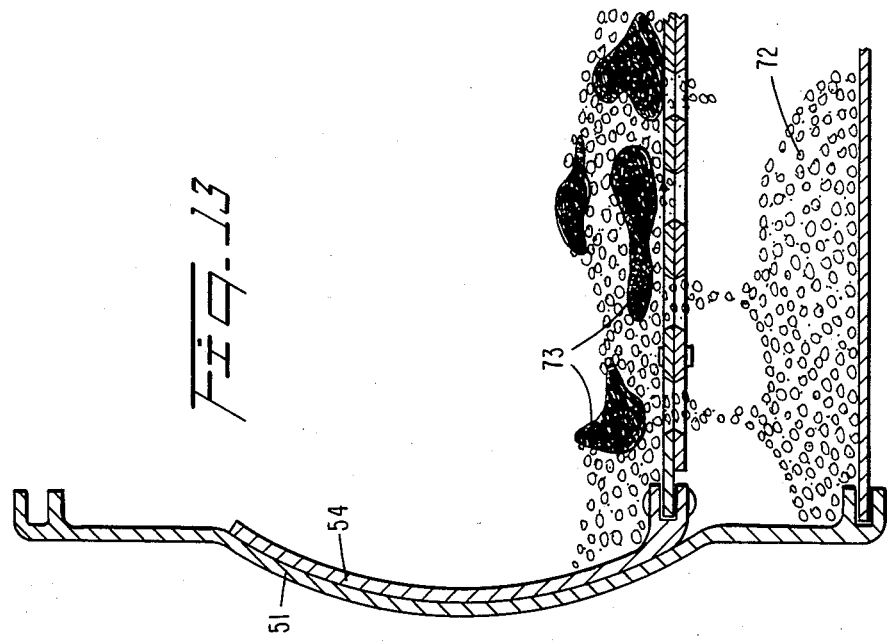

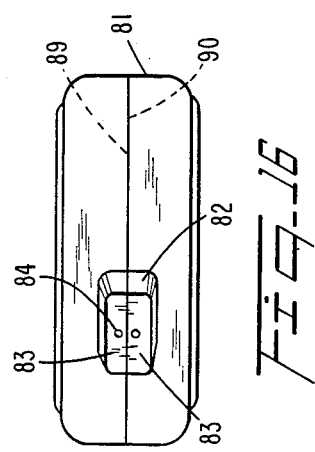
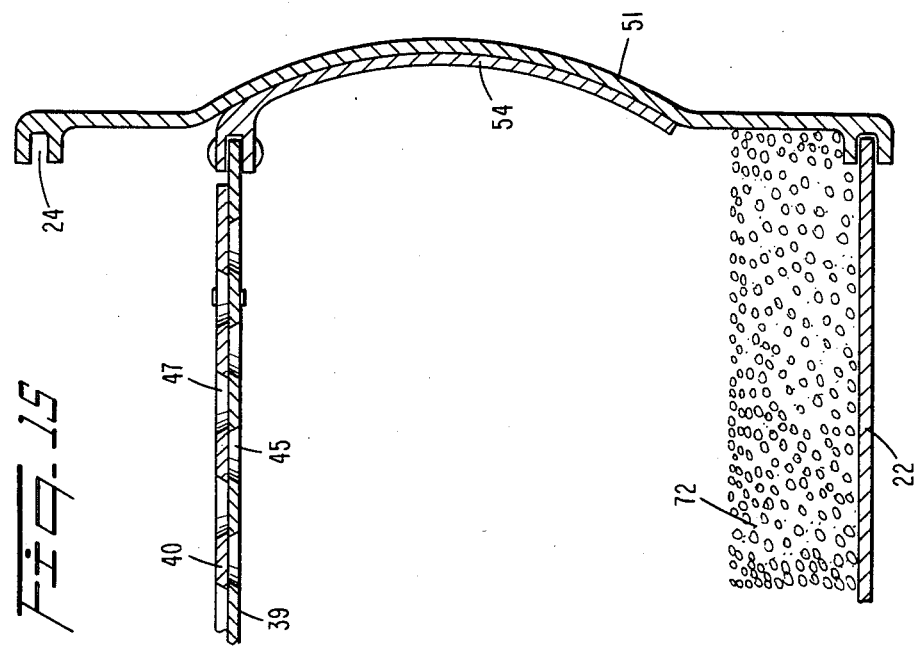

EASY CLEAN PET LITTER BOX

TECHNICAL FIELD

This invention relates to improvements in screens that can selectably either hold a mix of pellet-like materials of different characteristic dimensions or, when adjusted and shaken, segregate materials of different sizes. The invention further relates to improvements in pet litter boxes using such screens which facilitate easy separation of animal wastes from reusable litter, to allow disposal of the former and reuse of the latter without human contact therewith.

BACKGROUND OF THE INVENTION

Many city dwellers keep small pets, e.g., cats, hamsters or rabbits. Cats, in particular, are fastidious about their personal hygiene and instinctively seek to cover up their excrement with loose soil or sand. In urban environments, to meet this need, cat owners generally provide their pets with litter boxes partially filled with specially manufactured granular or pelletized 'cat litter'. Most such commercially available pet litter is designed to absorb the fluid from animal wastes deposited therein, forming dry lumps of solid excrement and litter clumps held together by dried pet urine. These solid wastes must be removed frequently to keep the pet happy. Most of the litter granules in the litter box may be left in, for subsequent use by the pet, if the dried waste lumps and litter clumps are extracted therefrom for disposal. This effort saves the pet owner money but has to be done regularly and is generally a process that pet owners using conventional litter boxes do not enjoy.

Various improvements on the basic animal litter box have been patented. Examples of these include: 'Self-Cleaning Litter Box', U.S. Pat. No. 4,325,325 to Larter, comprising two identical rectangular containers with a perforated and somewhat shallower tray fittable between them to separate litter granules from dried waste; 'Pet Litter Separator', U.S. Pat. No. 4,325,822 to Miller, also having two identical containers that can have a flat perforated screen fitted between them to separate litter from waste; and 'Self Straining Animal Litter Box', U.S. Pat. No. 3,908,597 to Taylor, having a four sided open box selectively divisible by a sliding partition, two trays with perforated bases to fit on either side of the removable partition, and open-box caps to cover either open end of the four sided open box with the perforated trays placed therein.

All of these devices require the user to pick up, hold together and tip over a collection of boxes and trays and then store bulky parts of the apparatus separately for use only during the litter separation phase, thus taking up room. The screens employed therein cannot be conveniently and controllably kept free of animal waste encrustations and may cause inconvenience to a pet by snagging the pet's claws.

A need, therefore, exists for simple and compact apparatus that permits easy and clean separation of reusable pet litter from dry pet excrement, does not require separate storage of bulky components, is easily kept free of animal waste encrustations and is easy for a pet to use.

DISCLOSURE OF THE INVENTION

Accordingly, it is an object of this invention to provide an apparatus for containing pet litter for a pet's use and for periodically facilitating easy, quick and clean separation of dry pet excrement therefrom for disposal.

Another object of this invention is to provide an apparatus for containing and retaining reusable pet litter, which allows separation therefrom of dry animal wastes, that is compact and does not require the separate storage of any elements.

Yet another object of this invention is to provide an apparatus for containing and retaining reusable pet litter, which allows separation and disposal therefrom of dry animal wastes, which forms a single compact assembly capable of single-handed operation.

These and other related objects of this invention, as described more fully below, are achieved by providing, in one preferred embodiment, an open box with a flat sheet that can serve as either the top or the bottom. The box has a large opening at one substantially vertical end, wherein is inserted a specially designed tray to contain pet litter. The tray has a perforated bottom under which is a movable sheet provided with the same pattern of perforations. Means, such as a rack and pinion, is employed to slide the perforated sheet in contact with the tray bottom so as to selectively bring all perforations into congruence (open mode), in which case granules of litter being smaller than the perforations will fall through when the litter box is shaken and be caught on the bottom sheet below, or into total mismatch (closed mode), in which case the tray can contain its contents (clean or resuable litter, litter with animal wastes, or animal wastes separated from reusable litter). Lumps of dry animal waste and clumped litter too large to fall through the tray perforations are thus easily separated and may then be disposed of. The empty tray, in the closed mode, is returned upside down, the box turned over, and the bottom sheet replaced underneath for reuse of the reusable litter.

In another embodiment, the tray is eliminated, while its two-part perforated bottom is made centrally integral with a symmetric litter box. The principle of operation for both embodiments is essentially the same, each having a single flat sheet that is affixable to serve as either the top or the bottom of the litter box as necessary.

In both embodiments presented herein, the holes are preferably conically chamfered, to funnel litter granules therethrough and also to scrape off any dried waste encrustations between the two contacting perforated sheets whenever they are moved with respect to each other. All parts remain together during use of the apparatus by the pet. The chamfer also prevents the aperture edges catching the pet's claws when the pet is attempting to cover up its waste by covering it with loose litter.

Still other objects and advantages of the present invention will become readily apparent to those skilled in this art from the following detailed description, wherein we have shown and described only the preferred embodiments of the invention, simply by way of illustration of the best modes contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a vertical lengthwise cross-sectional view of a litter box in accordance with a first preferred embodiment of the invention;

FIG. 2 is a rear elevation of the exterior of the first embodiment;

FIGS. 3, 4 and 5, respectively, are vertical sectional views of the first embodiment showing convex curved, ridged, and channeled tray sides in sliding fit with the litter box.

FIG. 6 is a partial plan view of the front end of the tray of the first embodiment;

FIG. 7 is a front end elevation view of the tray shown in FIG. 6;

FIG. 8 is a partial plan view of the rear end of the tray shown in FIG. 6, showing a rotatable handle and link mechanism used to obtain either the open or closed mode for the tray;

FIG. 9 is a plan schematic diagram to explain the operation of the rotating handle and rotatable length in moving elements of the tray shown in FIG. 6;

FIGS. 10–15 explain the operation of the first embodiment step by step. FIGS. 10 and 15 are partial vertical sectional views of the first embodiment, in which the tray has curved sides, showing the tray in its "bottom down" and "upside down" positions respectively.

FIG. 10 shows the tray with the perforated bottom and sheet with congruent apertures, i.e., in the open mode, with no pet litter present.

FIG. 11 shows the assembly of FIG. 10 with the tray in closed mode and with fresh pet litter in the tray.

FIG. 12 shows the assembly of FIG. 11, with the tray in closed mode, after it has been used by a pet, with solid pet waste mixed in with the litter.

FIG. 13 shows the assembly of FIG. 12, with the tray in open mode, indicating how the small granules of pet litter sift through the perforations leaving behind solid animal waste lumps in the tray.

FIG. 14 shows the assembly of FIG. 13, with the tray in closed mode, with only solid animal waste lumps in the tray, segregated from the reusable pet litter below and now ready to be disposed of.

FIG. 15 indicates how the empty tray is repositioned upside down prior to turning over of the entire assembly.

FIG. 16 is an exterior perspective view, from the spout or front end, of a second embodiment of the apparatus of this invention.

The same numbers are used to identify like elements, or parts of elements, in each of the drawings and for purposes of reference elsewhere in the specification.

BEST MODE FOR PRACTICING THE INVENTION

Figure 17:
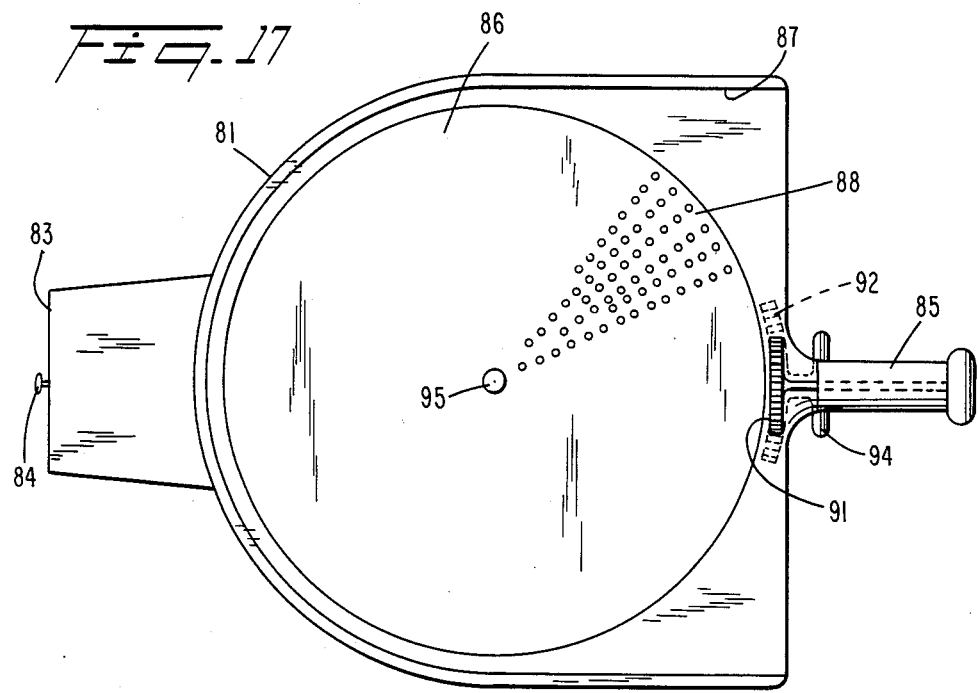
FIG. 17 is a plan view of the second embodiment, employing a pinion and circumferential rack to obtain either the open or closed mode for the perforated partition of the assembly.

As shown in FIGS. 1 and 2, a cat litter box 21 in accordance with a first, preferred embodiment of the invention basically has the shape of a generally upright and substantially rectangular pet litter box 21 with a separate flat sheet-like element 22 that serves, at the user's option, as either the top or the bottom thereof. Sheet 22 is generally rectangular and may be slid into grooves 23 and 24 at either the nominal top or the bottom of litter box 21 from one end. In this position, sheet 22 fits snugly into the grooves and effectively seals off either the top or the bottom, as the case may be, so that none of the contents in that part of litter box 21 will leak out.

In FIGS. 1 and 2, sheet 22 serves as the bottom surface of litter box 21. Note that the particular version of the apparatus shown in FIGS. 1 and 2 is the one in which the sides of litter box 21 have an outwardly convex curvature along its longer sides. Litter box 21 has a symmetry about the mid-horizontal plane as well as about the mid-lengthwise vertical plane. As made clear in FIG. 2, there is a generally rectangular, centrally located, span-wide aperture 25 in the rear wall of litter box 21. Through this aperture may be inserted litter tray 31. When tray 31 is in place in box 21, as shown in FIG. 2, approximately one-fourth the volume of the box is below the bottom of the tray. This proportion may be altered by modifying the dimensions of either the tray 31 or box 21, or both.

Tray 31, as shown in FIG. 2, also has convex outwardly curved sides to snugly fit into litter box 21. This is made clearer in FIG. 3, wherein litter box 21 has a curved side 51 that very closely matches the curvature of tray side 54. The snug fit of tray 31 inside litter box 21 serves a variety of purposes, including the exclusion of any litter or animal waste from the space between the tray and the box as well as adequate support to carry the weight of the litter tray and its contents at all times. FIG. 4 shows an alternative configuration and geometry to achieve the same purpose. In this alternative, litter box 21 has planar vertical sides in which there is a central channel or groove 52 along its length, to closely match a ridge or rail 55 on the outside wall of tray 31. FIG. 5 shows yet another variation in geometry that would serve the same purpose, wherein the longitudinal side of litter box 21 is provided with a longitudinal ridge or rail 53 that closely matches adjacent channel or groove 56 in the side of litter tray 31. In all these cases, the weight of the litter tray 31 is transmitted generally vertically downward through the sides of litter box 21. Also, in all variations, the user would find it convenient to guide the tray into the box and to pull it out when necessary.

As indicated in FIG. 1, and made explicit in FIG. 6, litter tray 31 has a narrowing portion 32 at its front end, leading to a relatively small central opening normally kept covered by a generally flat door 42. As made clear in FIG. 7, door 42 may conveniently be pinned at the center of its top edge by a pin 50 such that it can be rotated as indicated by phantom lines in FIG. 7 to open a small aperture at the front central portion of tray 31. Door 42 may be rotated about pin 50 by pulling on handle 49. In normal use, the weight of door 42 will cause it to rest against stop 43 which is just a small protrusion of tray 31.

The front end of litter box 21 in this embodiment is shaped to accommodate tapered portion 32 of litter tray 31. As shown in FIGS. 1 and 2, tray 31 has a flat sheet-like bottom 39. As shown in FIG. 8, this sheet-like bottom 39 of tray 31 is provided with a carefully selected pattern of apertures 45. Tray 31 is provided along its bottom edges on the inside with grooves 44 into which sheet 39 is inserted in a tight fit. Pins 61, at different positions along grooves 44, affix sheet 39 firmly to the sides of the tray 31. Directly beneath bottom sheet 39 of tray 31 is perforated sheet 40, provided with the same pattern of apertures as in bottom 39. As is made explicit in FIG. 10, the apertures in bottom sheet 39 of tray 31 and the adjacent perforated sheet 40 are provided with chamfers 46 and 47 respectively, inclined preferably at an angle 45° with the principal flat surfaces in each. The chamfer 46 of each aperture 45 in bottom 39 of tray 31 is intended to funnel granular pet litter out of the tray through the aperture. A direct consequence of providing such a chamfer is that the bottommost edge of each of apertures 45 has a sharp angular form. Chamfers 48 in each of comparable apertures 47, in perforated sheet 40 immediately in contact outside bottom sheet 39 of tray 31, are oppositely directed and causes apertures 47, likewise, to have sharp edges at the contacting surface of tray 31. Perforated sheet 40 is provided with elongated perforations 62 directed lengthwise with respect to tray 31. As indicated in FIGS. 2, 8 and 10, pins 41 passing through tray bottom 39 also pass through elongated perforations 62 of perforated sheet 40 to hold sheet 40 in close contact with tray bottom 39 while permitting controlled sliding movement between them. This freedom of sliding contact between perforated sheet 40 and perforated bottom 39 of tray 31 immediately adjacent to it is the key to the proper functioning of the apparatus of this invention. By using sliding motion between elements 39 and 40 it is possible to go from one extreme, in which all the apertures of one (tray bottom 39) are totally congruent with all the apertures of the other (sheet 40), to the other extreme, where there is a total mismatch between all the apertures of one (tray bottom 39) and all the apertures of the other (sheet 40). These two extreme configurations are referred to herein as the "open mode" and the "closed mode", respectively, of the pet litter tray 31. The purpose of the closed mode is, as is self-evident, to retain within the tray any contents, e.g., clean pet litter, used litter with animal waste, only animal waste, or reusable pet litter, deposited therein. On the other hand, when the tray is in the open mode, any back and forth motion of the apparatus combined with the effect of gravity will readily cause any granular pet litter in the tray to immediately fall through the apertures into the lower portion of litter box 21.

While there are many commercial forms of pet litter available on the market at present, and persons skilled in the art may be expected to select apertures to suit, a diameter of 5/16 of an inch for each of these apertures 45 and 47 should be satisfactory for most purposes. Typical animal waste deposited by small pets such as cats generally is of a size considerably larger than 5/16 of an inch and will, therefore, remain in tray 31 when it is placed in open mode and the apparatus shaken gently. Likewise, animal urine tends to coagulate and combine granular pieces of pet litter into clumps of varying sizes that harden upon becoming dry and these too will not pass through the apertures at the bottom of tray 31 when it is placed in open mode and shaken. There is thus provided a very simple and effective way to segregate reusable pet litter from solid animal waste forming dry lumps or liquid animal waste absorbed into and forming clumps of pet litter.

There are a number of alternatives for obtaining controlled relative sliding motion between perforated sheet 40 and adjacent contacting bottom surface of bottom 39 of tray 31. One simple technique, as shown in FIGS. 2, 8 and 9, employs a handle 35 rotatably attached to an extension 34 of the rear wall of pet litter tray 31. Handle 35 may conveniently be held in place by a nut and bolt arrangement 36. At the bottom part of handle 35 is provided a pin 37 at which is attached a rotatable small link 38, the other end of which is pinned to perforated sheet 40. Rotation of handle 35 about the axis of bolt 36, causes pin 37 to turn at a radius indicated in FIG. 9 by "r". The consequence of rotating handle 35 about center 36 is that the far end of length 37, where it is attached to perforated sheet 40, will experience a force tending to move perforated sheet 40, guided by guide pins 41 through elongated aperture 62, in a lengthwise direction with respect to tray 31. As is shown in FIG. 9 on the extreme right hand side where handle 35, in the position indicated as 35-A, makes an angle of 0° with respect to the rear wall of litter tray 31, by suitable location of the point at which length 38 is pinned to perforated sheet 40 it is possible to obtain the closed mode for the tray. Then, as indicated in the central portion of FIG. 9, at a predetermined angle $\theta$ indicated by handle position 35-B, perforated sheet 40 and perforated bottom 39 of tray 31 can be placed in the open, or aperture-congruent, mode. As indicated at the extreme left of FIG. 9, further clockwise rotation of handle 35 to the position indicated by 35-C, at 90° to the rear wall of litter tray 31, the apertures in sheet 40 and bottom 39 of litter tray 31 can again be put in the mismatched, or closed mode, position. It should now be clear that when handle 35 is in position 35-A the tray, being in the closed mode position, can contain pet litter and handle 35 is out of the way.

At the position shown as 35-B, at the center of FIG. 9, the tray should be in the open mode position and, when shaken, will allow reusable pet litter to sift through the open apertures at the bottom of tray 31. Finally, by putting the handle in position 35-C, as shown to the left in FIG. 9, the tray is once again placed in the closed mode position and should contain all large lumps of animal waste matter. In the final position then, with handle 35 normal to the rear of tray 31, it should be possible and convenient for the user by applying a directed force to remove tray 31 from litter box 21 in order to dispose of animal waste lumps therein.

As will be immediately apparent to persons skilled in the art, the employment of a rotating handle and a pinned short rotatable link is not the only way in which the desired relative motion between tray bottom 39 and perforated sheet 40 may be obtained. Other equally convenient techniques could involve the use of a pinion and an engaging rack, or a threaded portion on handle 31 engaging with an internally threaded matching boss attached to perforated sheet 40. Such mechanisms are old and well understood in the art and unnecessary details have not been provided in the figures. Persons skilled in the art can be expected to select appropriate sizes as necessary. One of the factors that would influence the selection of the sizes of racks and pinions or of threaded elements is, of course, the size and the relative distribution of the apertures selected. These are obviously matters requiring some engineering judgment and decision that should be well within the capacity of persons skilled in the art.

It should be appreciated that each of the techniques proposed herein for obtaining relative motion between bottom 39 of tray 31 and the adjacent contacting perforated sheet 40 involves the application of substantial mechanical force to movable element 40. Because the chamfered edges of all the aperatures are sharp, it should therefore follow that any dried encrustations of animal waste that may have penetrated into the space between bottom 39 of tray 31 and the adjacent surface of perforated sheet 40 will firmly and effectively be scraped away on each occasion of relative movement at that common surface. This ensures that the tray bottom will not get clogged up due to dried animal waste. Note also that by making handle 35 strong enough it should be very easy for a person employing only one hand to turn the handle to shake the entire apparatus to separate animal waste from reusable litter and to then simply pull out tray 31 containing only dry animal waste. The user would then take tray 31, tip it forward over a garbage bag or other disposing area, reach over to the front of tray 31, grasp handle 49 of door 42 thereat and turn door 42 into the position shown by phantom lines in FIG. 7. Tipping the tray forward will then cause the dry animal waste to fall out of tray 31. Door 42 can then be returned to its closed position against door stop 43 at the front of tray 31. Thus dry animal waste and any encrustations of animal waste have been safely, conveniently and easily segregated from reusable pet litter.

The step by step manner of using the apparatus described above is as follows:

1. Sheet 22 is inserted into the slots 24 provided therefor at the bottom of litter box 21. Tray 31 is placed in its closed mode and inserted into litter box 21. A suitable amount of fresh pet litter is now poured into the tray for use by a pet. At some point, as indicated in FIG. 12, there will be sufficient accumulation of dry animal waste to require its removal for further use of the litter box by the pet.

2. The bottom of litter tray 31 is now put in the open mode by operation of handle 35. It should now be possible to funnel the reusable pet litter through the apertures at the bottom of tray 31 into the space immediately below and above sheet 22. This is facilitated by shaking of the entire litter box 21 by the user grasping the handle 35. As shown in FIG. 13 the loose granular reusable pet litter 72 will now fall through.

3. As indicated in FIG. 14, when all the reusable pet litter 72 has fallen through the apertures at the bottom of tray 31 only the dry animal waste lumps 73 and urine impregnated pet litter clumps will remain in tray 31. Tray 31 is then put in the closed mode as indicated in FIG. 14, and removed from litter box 21.

4. The tray is inclined forward above a suitable place of disposal and door 42 in the tapered forward portion thereof is opened by grasping handle 49. The dry animal waste lumps are discarded, door 42 is shut against door stop 43, and the tray 31 reinserted into litter box 21 in an upside down manner, as shown in FIG. 15. The tray is still in the closed mode.

5. The entire litter box 21 is turned over so that what was originally the bottom at Step 1 is now the top. The reusable pet litter 72 will fall into tray 31 which is now in its closed mode and rightside up in litter box 21. Sheet 22 is withdrawn from what is now the top of litter box 21 and is inserted into the grooves 24 at what is now the bottom of litter box 21. Litter box 21 filled with reusable pet litter 72, in place in tray 31, is thus available for use by the pet. It may be necessary periodically to replace or replenish the reusable pet litter with fresh pet litter.

As discussed above, the relative motion of perforated sheet 40 adjacent to and in close contact with tray bottom 39 of litter tray 31 facilitates removal of any encrusted animal waste. It may be advisable, however, periodically, to wash the entire tray with suitable detergent and running water. Subsequently, when the tray is dry, a suitable pet deodorant may be sprayed into the tray and inside litter box 21 to control the inevitable odor.

Figure 18:
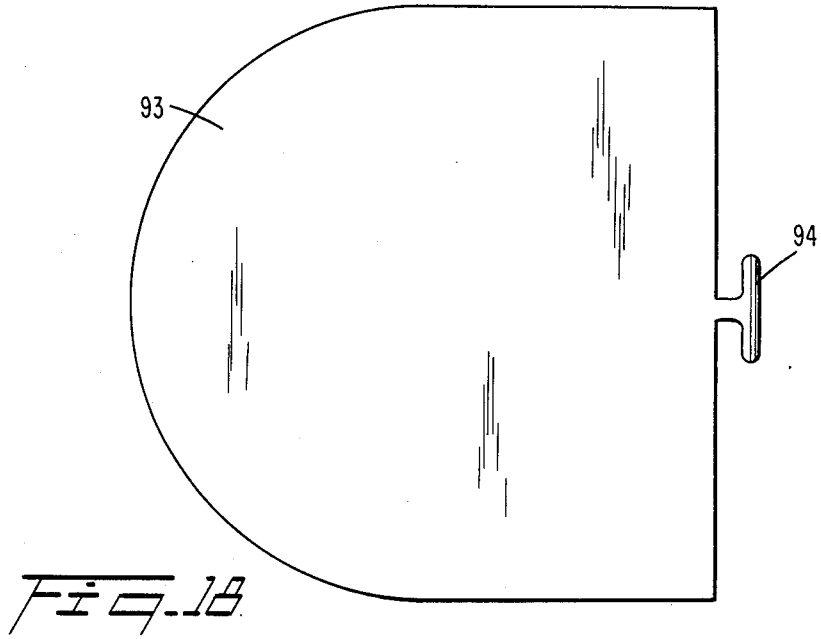
FIG. 18 is a plan view of a sheet element used in the second embodiment.

In another embodiment of the apparatus of this invention, shown in FIGS. 16–18 utilizing the same principles as have been discussed above, a horizontally symmetric housing 81 is provided with a permanently fixed, centrally located, perforated sheet 89 that serves as a partition to divide the housing into two equal halves. The housing 81 is provided at a forward end with a spout 82 which has an upper and a lower half as defined by partition 89 extending therethrough to the open end. Two symmetric, hinged, spring-loaded doors 83 are provided at the spout end to cover both the upper and the lower openings therein. The hinge and spring-loading is preferably provided at the outside longer edges of the doors 83 as shown in FIG. 16. Doors 83 are each provided with a small handle 84 to facilitate the opening thereof. At either the top or the bottom of housing 81 there is, preferably, a large round opening 86 through which the pet may enter the litter box to use it. Around the front half of circular opening 86 and extending to either side linearly to the end of housing 81 is a groove 87 to accommodate and to firmly hold therein a flat sheet-like element 93 that will serve selectively as either the top or the bottom of housing 81. Sheet 93, as shown in FIG. 18, preferably is provided with a small handle 94 for convenient withdrawal from grooves 87. Partition 89 is provided with a predetermined, substantially radial, distribution 88 of apertures 45 chosen to be large enough to permit the passage therethrough of pet litter while retaining above the partition any lumps or clumps of dried animal waste. Any distribution of apertures may be used, including, particularly, the type discussed as suitable for the first embodiment. Likewise, any of various techniques may be employed for obtaining the respective open and closed modes. On one side of partition 89 and in close contact therewith is a perforated sheet 90 provided with the identical aperture distribution 88 as in partition 89. As shown in FIG. 17, one convenient manner of attaching perforated sheet 90 to perforated partition 89, when both are provided with circularly symmetric aperture distributions, is to have a single central pin 95 which will permit the relative rotational movement while keeping them very close to each other. For this configuration it is convenient, as shown in FIG. 17, to provide a rotatable handle 85 at the rear end of housing 81. Rotation of handle 85 about its own axis will cause the rotation of an attached pinion 91, which meshes with a circumferentially disposed rack 92 attached to perforated movable sheet 90. Rotation of handle 85 will therefore cause rotational displacement of perforated sheet 90 with respect to perforated partition 89. Thus, by controlling the rotation of handle 85, a user may selectively put the aperture distributions in perforated sheet 90 and perforated partition 89 either in total congruence or in a total mismatch configuration. The former will constitute the open mode for this embodiment, and the latter will constitute the closed mode therefor. The manner of using this embodiment is very similar to that described above for the first embodiment and a step by step description therefor is provided below.

1. Sheet 93 is inserted into grooves 87 on one side of housing 81. That side then constitutes the bottom of the litter box. Handle 85 is now turned to ensure that the perforated sheet 90 is in the closed mode configuration with respect to perforated partition 89. Fresh pet litter is now poured into litter box 81, through opening 86, to the desired depth. The litter box is now ready and available for use by a pet. Over a period of time, as animal waste accumulates, it will become appropriate to separate the reusable pet litter from the animal waste that ought to be discarded.

2. Handle 85 is now turned so that the apertures in perforated sheet 90 are congruent with the apertures in perforated partition 89, i.e., the litter box is placed in open mode. The user then grasps handle 85 and gently shakes litter box 81 to cause reusable litter to fall through the open apertures into the lower half thereof. Eventually only lumps of animal waste matter and urine impregnated clumps of pet litter will remain in the upper half. Handle 85 is now turned to obtain the closed mode. The user may now position the spout 82 above the point at which the animal waste is to be disposed of, grasp handle 84 of the upper door 83 and tip the entire unit forward to cause the dry animal waste matter to fall out of spout 82. Handle 84 is now released and spring-loaded door 83 will close.

3. The entire unit is now turned upside down so that what was up to this point the top now becomes the bottom.

4. Sheet 93 is now extracted from what is presently the top of the unit and is inserted into the grooves 87 at what is now the bottom of the unit. Litter box 81 now contains reusable pet litter in what is presently its upper half and, the uppermost large opening 86 now being opened, the litter box is ready and available for use by the pet. As before, over time, it may be appropriate either to replace or replenish the litter that is in the box.

It is appropriate to note that the entire operation of this embodiment, as described in individual steps above, can be carried out by a person using only one hand without coming into contact with any animal waste whatsoever. Occasionally it will be desirable to wash and clean up the entire unit and, if desired, to spray it with suitable disinfectant or deodorant.

To expedite the segregation of animal waste lumps from the smaller typical reusable litter pellets, it is important to obtain the maximum 'openness' in the perforated surfaces upon which the animal waste and litter mixture rests. Analysis leads to the conclusion that when circular perforations of the small diameter are employed the maximum openness or area available to throughflow is obtained by locating the centers of the perforations, i.e., apertures 45 and 47, in a square pattern, wherein the sides of the equal squares are not smaller than $\sqrt{2}$ (square root of two) times the common perforation diameter as that dimension is measured at the common surface at which the two perforated sheets 39 and 40 make sliding contact. This is the pattern shown in FIG. 8, wherein the optimum direction of relative sliding movement between the contacting sheets is at 45° to the lines describing the square pattern of centers as described above.

It should be apparent from the preceding disclosure that this invention may be practiced otherwise than as is specifically described and disclosed herein. Modifications may therefore be made to the specific embodiments disclosed above without departing from the scope of this invention, and all such modifications are intended to be included within the claims appended below.

What is claimed is:

1. An easy to clean pet litter box that saves reusable pet litter, comprising:

a generally upright box composed of four sides and open at its top and bottom ends;

a generally flat cover, sized and shaped to be attached to said box at either said top end or said bottom end thereof;

a tray, sized and shaped to snugly fit said box within said four sides, open at its top and provided with a bottom containing perforations of predetermined shape, size and distribution;

a perforated sheet, whose perforations match said perforations of predetermined shape, size and distribution in said tray bottom, making substantial sliding contact with and movably attached to the outside of said tray bottom; and control means for controllably moving said perforated sheet with respect to said perforated tray bottom so as to selectively obtain substantial congruence or substantial mismatch between said matching perforation distributions therein.

2. An easy to clean pet litter box that saves reusable pet litter as specified in claim 1, wherein:

said perforations in said tray bottom and said perforated sheet are all circular and of the same size.

3. An easy to clean pet litter box that saves reusable pet litter as specified in claim 2, wherein:

each of said perforations has a conical chamfer at its periphery, such that the smallest diameter in each perforation is located closest to the common surface at which said tray bottom and said movably attached perforated sheet make substantial sliding contact.

4. An easy to clean pet litter box that saves reusable pet litter as specified in claim 3, wherein:

said box is provided at a first end with a central aperture shaped and sized to accommodate the insertion therethrough of said tray.

5. An easy to clean pet litter box that saves reusable pet litter as specified in claim 4, wherein:

said tray, at a forward end, has a tapered shape narrowing to a closeable aperture; and said box is provided at a second end, opposite to said first end thereof, with an outwardly extending cavity to accommodate therein said forward tapered end of said tray inserted through said central aperture at said first end thereof.

6. An easy to clean pet litter box that saves reusable pet litter as specified in claim 5, wherein:

said control means comprises a handle rotatably connected to a rear end of said tray, and comprises a rotatable link, pinned at a first link end at a predetermined point on said handle and pinned at a second link end to said perforated sheet, such that rotation of said handle with respect to said tray will effect controlled sliding displacement of said perforated sheet with respect to said perforated tray bottom to selectively obtain said congruence or said mismatch between said perforations therein.

7. An easy to clean pet litter box that saves reusable pet litter as specified in claim 5, wherein:

said control means comprises a handle rotatably connected to a rear end of said tray, a pinion connected to said rotatable handle, and a rack attached to said perforated sheet and meshing with said pinion such that rotation of said handle with respect to said tray will move said rack to effect controlled sliding displacement of said perforated sheet with respect to said perforated tray bottom to selectively obtain said congruence or said mismatch between said perforations therein.

8. An easy to clean pet litter box that saves reusable pet litter as specified in claim 5, wherein:
said control means comprises a handle rotatably connected to a rear end of said tray, a portion of said rotatable handle being provided with a screw thread and a threaded boss screwed thereon and attached to said perforated sheet such that rotation of said handle with respect to said tray will move said boss to effect controlled sliding displacement of said perforated sheet with respect to said perforated tray bottom to selectively obtain said congruence or said mismatch between said perforations therein.

9. An easy to clean pet litter box that saves reusable pet litter as specified in claim 5, wherein:
said tray has two long sides, substantially normal to said forward and rear ends, that are shaped to each have a symmetric convex bulge longitudinally therein; and
said box has its corresponding long sides and said central aperture at said first end all shaped and sized to match said bulges in said long sides of said tray to snugly and slidably receive and thereby firmly support the weight of said tray, its contents and user pet.

10. An easy to clean pet litter box that saves reusable pet litter as specified in claim 5, wherein:
said tray has two long sides, substantially normal to said forward and rear ends, that are provided to each have an outside longitudinal centrally located ridge; and
said box has its corresponding long sides and said central aperture at said first end all shaped and sized to provide channels that match and cooperate with said ridges in said long sides of said tray to snugly and slidably receive and thereby firmly support the weight of said tray, its contents, and user pet.

11. An easy to clean pet litter box that saves reusable pet litter as specified in claim 5, wherein:
said tray has two long sides, substantially normal to said forward and rear ends, that are provided to each have an outside longitudinal centrally located channel; and
said box has its corresponding long sides and said central aperture at said first end all shaped and sized to provide ridges that match and cooperate with said channels in said long sides of said tray to snugly and slidably receive and thereby firmly support the weight of said tray, its contents, and user pet.

12. An easy to clean pet litter box that saves reusable litter, comprising:
a bi-symmetric generally upright box-like housing, having substantial openings in its top and bottom faces;
guides around substantial portions of the peripheries of said openings in said top and bottom faces of said housing;
attached to a forward, substantially vertical, side of said housing, an elongated, centrally located, horizontal spout open at its free end;
at the horizontal plane of symmetry of said housing, a flat partition symmetrically dividing said housing, including said spout, into similarly shaped and sized upper and lower halves, respectively;
at said open terminal end of said spout, two symmetrically hinged spring-loaded doors, each capable of readily closing one half of the spout opening as defined by said flat partition ending at said spout opening;
handles on each of said doors, to facilitate holding open thereof;
in said flat partition, within said housing, a plurality of apertures of predetermined size and distribution;
a perforated sheet, whose perforations match said perforations of predetermined size and distribution in said partition, making substantial sliding contact with and movably attached to one side of said partition; and
control means for controllably moving said perforated sheet with respect to said perforated partition so as to selectively obtain substantial congruence or substantial mismatch between said matching perforation distributions therein.

13. An easy to clean pet litter box that saves reusable pet litter as specified in claim 12, wherein:
said perforations in said partition and said perforated sheet are all circular and of the same size.

14. An easy to clean pet litter box that saves reusable pet litter as specified in claim 13, wherein:
each of said perforations has a conical chamfer at its edge, such that the smallest diameter in each perforation is located closest to the common surface at which said partition and said movably attached perforated sheet make substantial sliding contact.

15. An easy to clean pet litter box that saves reusable pet litter as specified in claim 14, wherein:
said control means comprises a handle rotatably connected to a rear side of said housing, and comprises a rotatable link, pinned at a first link end at a predetermined point on said handle and pinned at a second link end to said perforated sheet, such that rotation of said handle with respect to said housing will effect controlled sliding displacement of said perforated sheet with respect to said perforated partition bottom to selectively obtain said congruence or said mismatch between said perforations therein.

16. An easy to clean pet litter box that saves reusable pet litter as specified in claim 14, wherein:
said control means comprises a handle rotatably connected to a rear side of said housing, a pinion connected to said rotatable handle, and a rack attached to said perforated sheet and meshing with said pinion such that rotation of said handle with respect to said housing will move said rack to effect controlled sliding displacement of said perforated sheet with respect to said perforated partition bottom to selectively obtain said congruence or said mismatch between said perforations therein.

17. An easy to clean pet litter box that saves reusable pet litter as specified in claim 14, wherein:
said control means comprises a handle rotatably connected to a rear side of said housing; a portion of said rotatable handle being provided with a screw thread and a threaded boss screwed thereon attached to said perforated sheet such that rotation of said handle with respect to said housing will move said boss to effect controlled sliding displacement of said perforated sheet with respect to said perforated partition bottom to selectively obtain said congruence or said mismatch between said perforations therein.

18. An easy to clean pet litter box that saves reusable pet litter as specified in claim 14, wherein:
said perforation distributions in said partition and said movably attached perforated sheets are symmetric about a common center;
said perforated sheet is rotatably pinned to said perforated partition at said common center; and
said control means comprises a handle rotatably connected to a rear side of said housing, a pinion connected to said handle, and a circumferentially disposed rack attached to said perforated sheet and meshing with said pinion such that rotation of said handle with respect to said housing will move said rack to effect controlled rotational movement of said perforated sheet with respect to said perforated partition about said common center to selectively obtain said congruence or said mismatch between said perforations therein.

19. A screen that selectably either holds or segregates a mix of pellet-like materials of different characteristic dimensions, comprising:
a first sheet containing circular perforations of predetermined size and distribution;
a second sheet in substantial sliding contact with said first sheet, containing circular perforations that match said circular perforations of predetermined size and distribution in said first sheet, said distribution being such that the centers of said circular perforations lie in a pattern comprising squares whose sides are $\sqrt{2}$ (the square root of two) times the common diameter of said perforations as measured at a common surface at which said first and second sheets make substantial sliding contact with each other;
positioning means to position and maintain said first and said second sheets in substantial sliding contact with each other;
control means for controllably moving said perforated first and second sheets with respect to oe another so as to selectively obtain substantial congruence or substantial mismatch between said matching perforation distributions therein; and
support means to support said screen to receive said mix of pellet-like materials of different characteristic sizes thereon.

20. A screen as specified in claim 19, wherein:
each of said circular perforations in said first and second sheets tapers in a conically narrowing manner towards the common surfaces at which said first and second sheets make said substantial sliding contact with each other to facilitate gravity assisted flow of smaller sized pellets therethrough.

21. A screen as specified in claim 20 wherein:
said first and second perforated sheets are guided in said sliding contact so as to move with respect to one another in a direction parallel to one of the diagonal directions in said square pattern.

22. A screen as specified in claim 21, further comprising:
means to agitate said screen to promote flow through said perforations in said first and second sheets when their perforation distributions are congruent.

* * * * *